Jan. 13, 1931.  W. LOEFFLER  1,788,920
SAWING MACHINE
Filed April 19, 1926   7 Sheets-Sheet 1
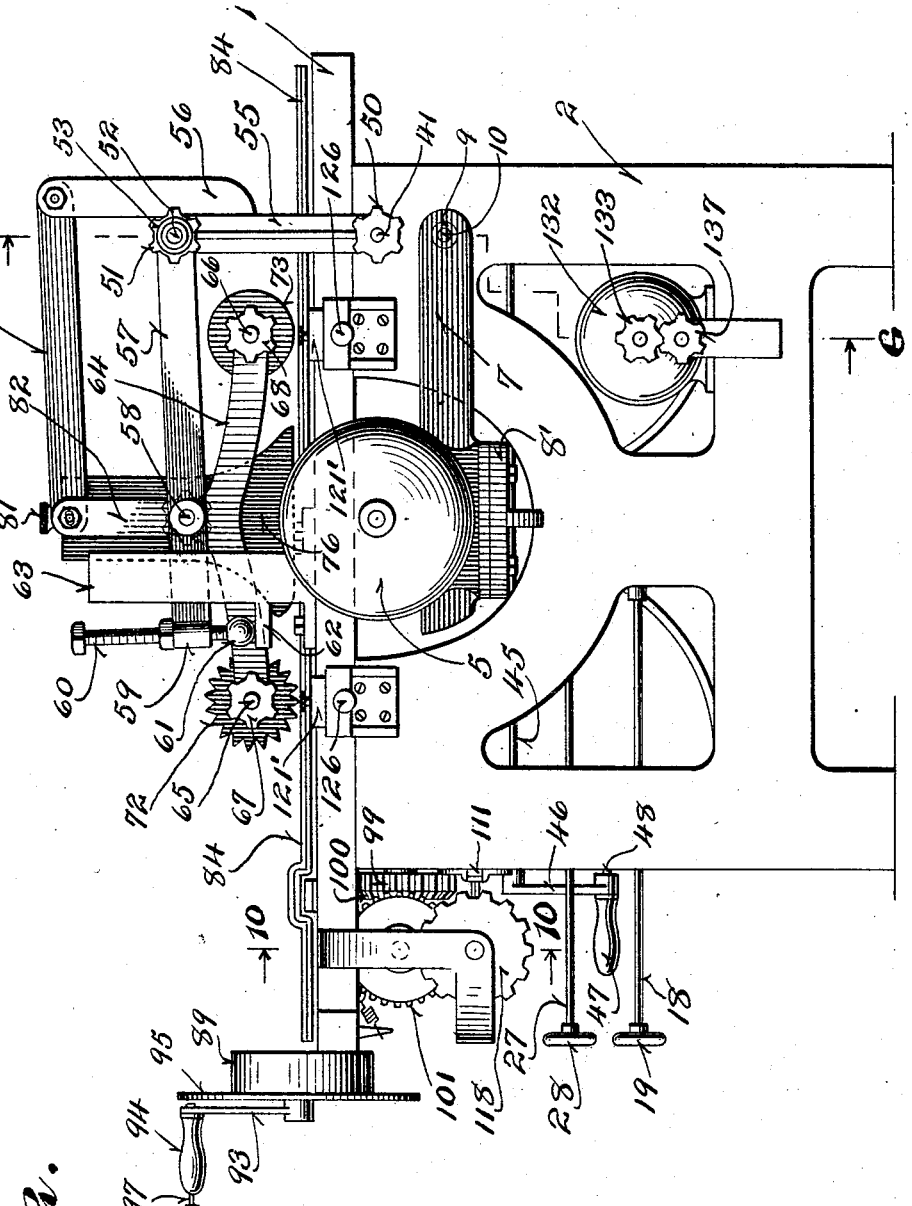
Inventor
William Loeffler Jan. 13, 1931. W. LOEFFLER 1,788,920
SAWING MACHINE
Filed April 19, 1926 7 Sheets-Sheet 2
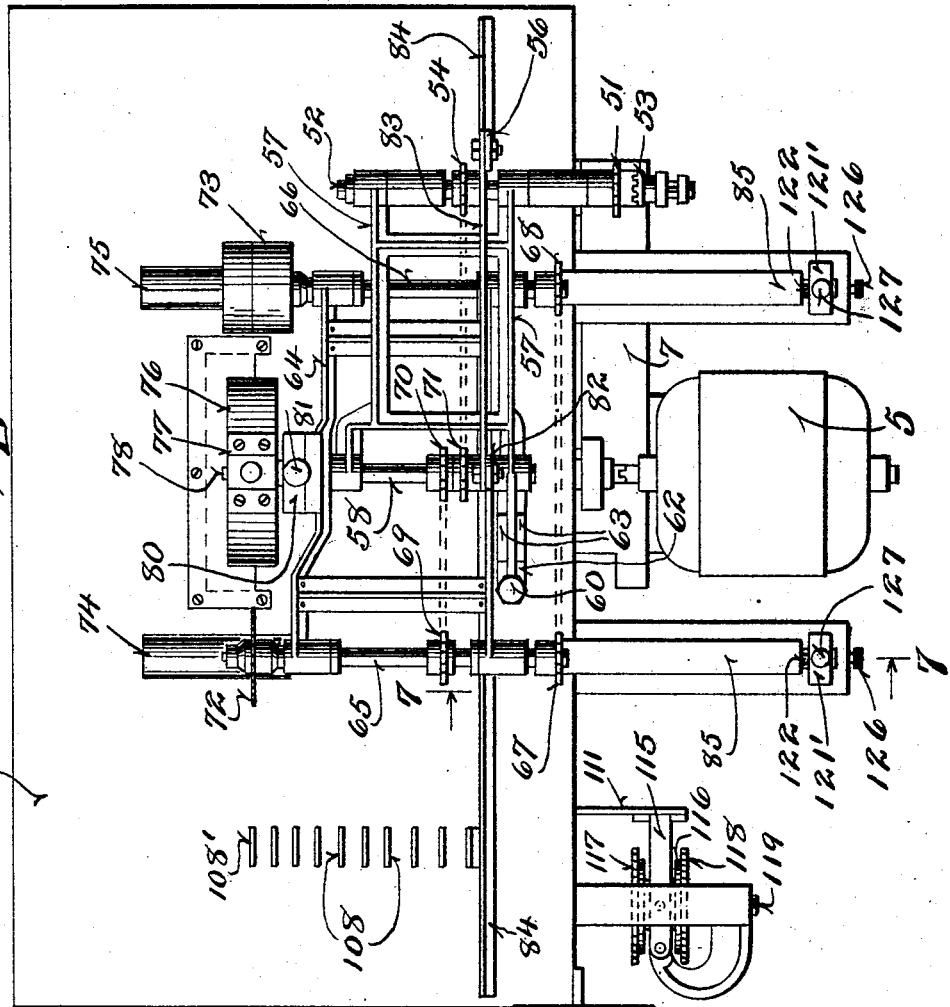
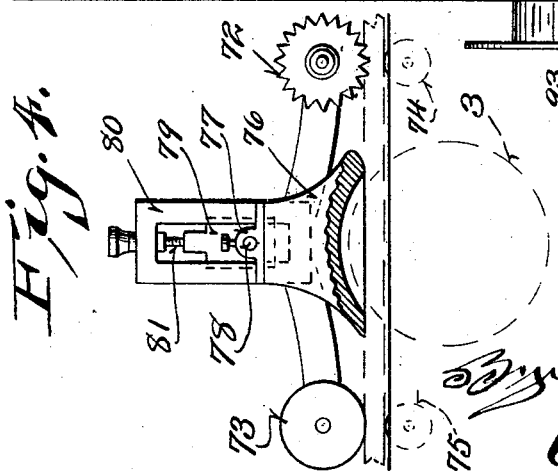

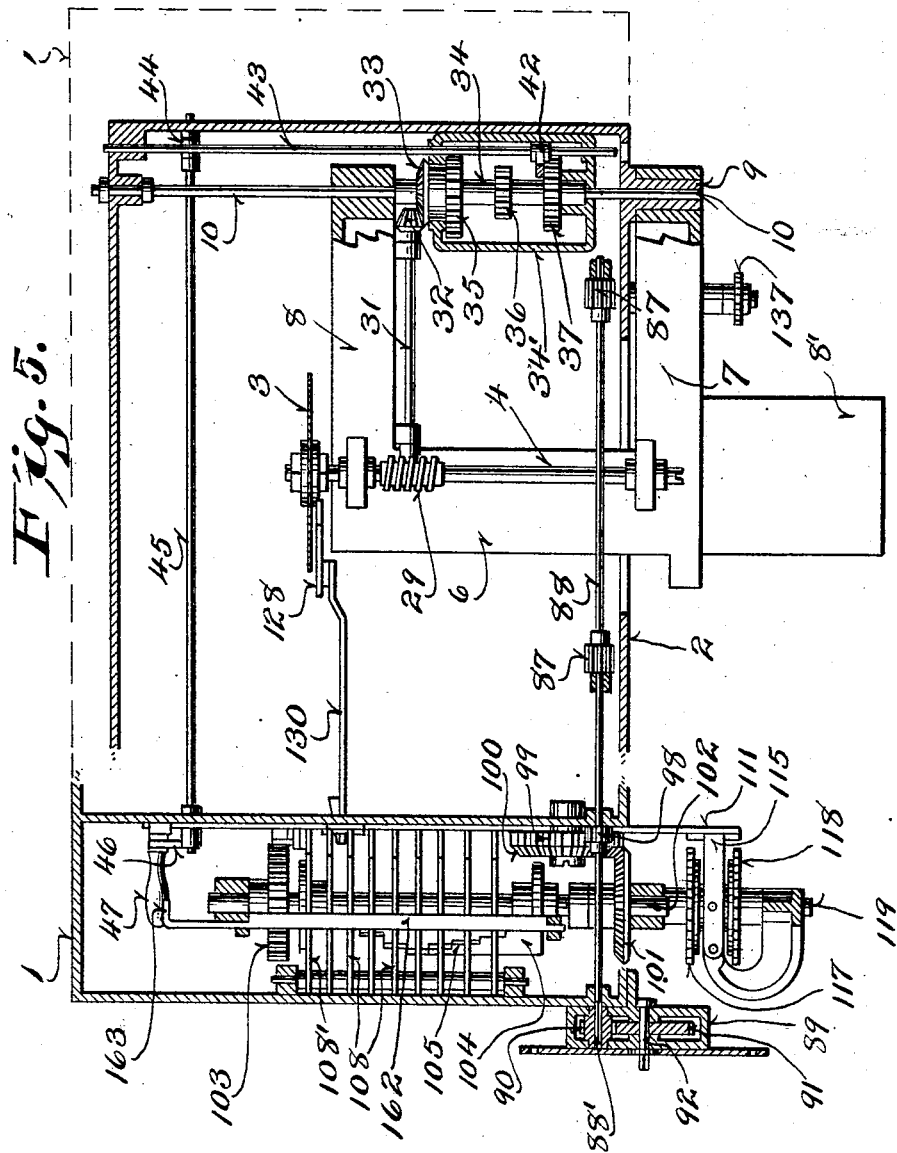

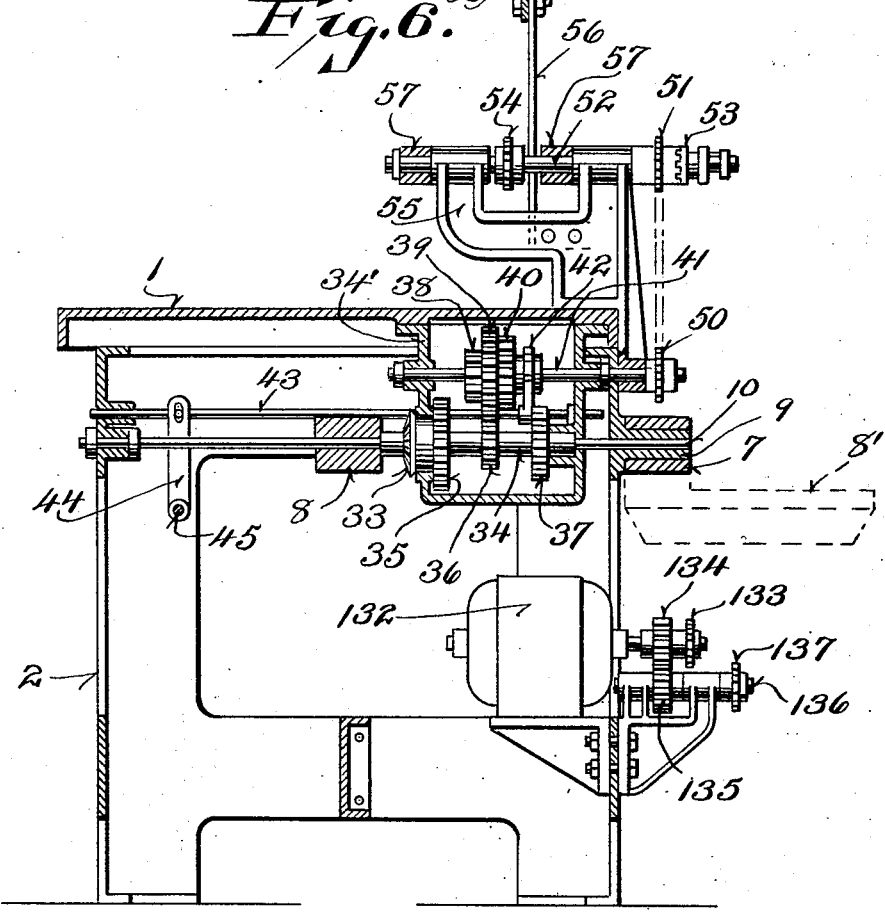

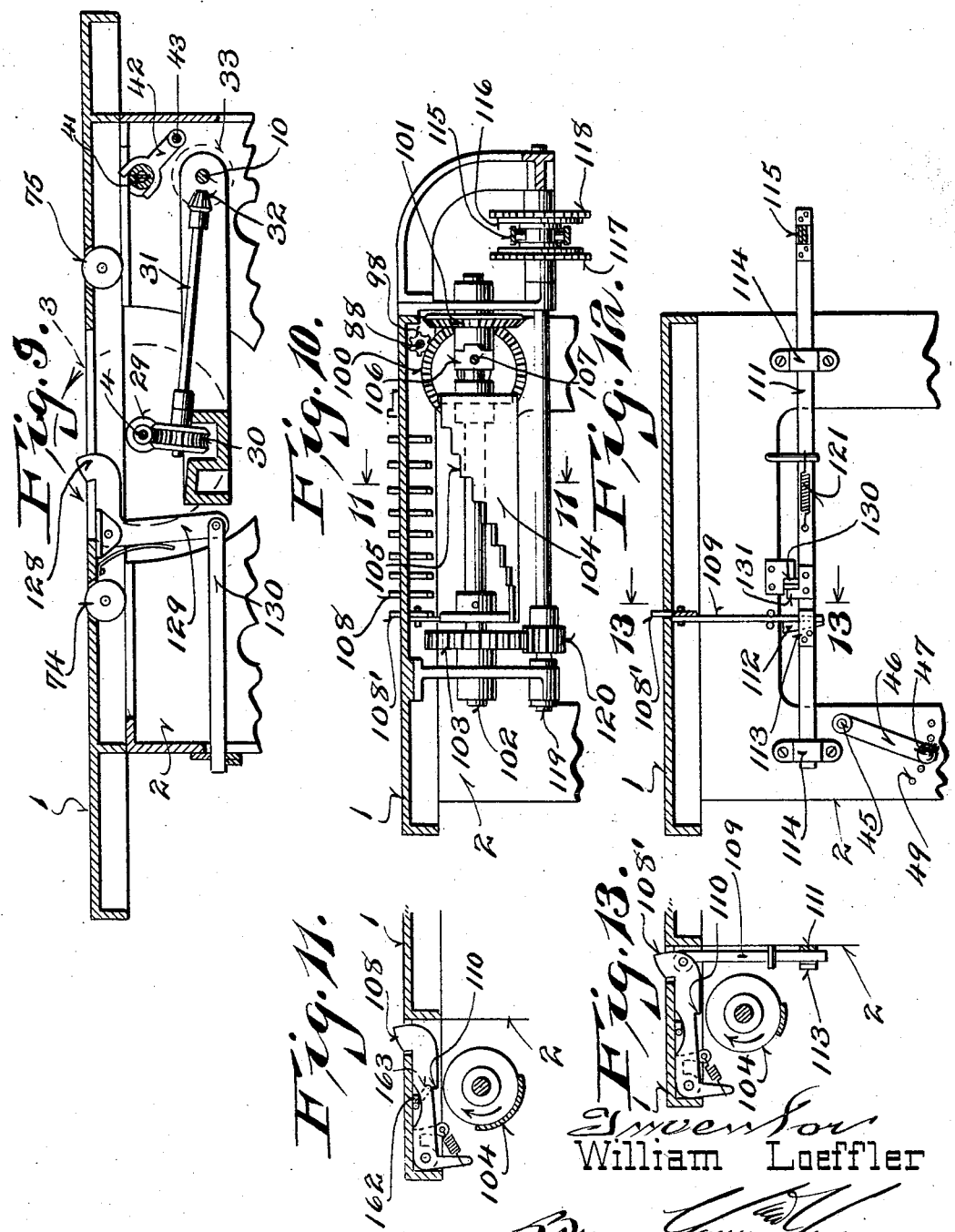

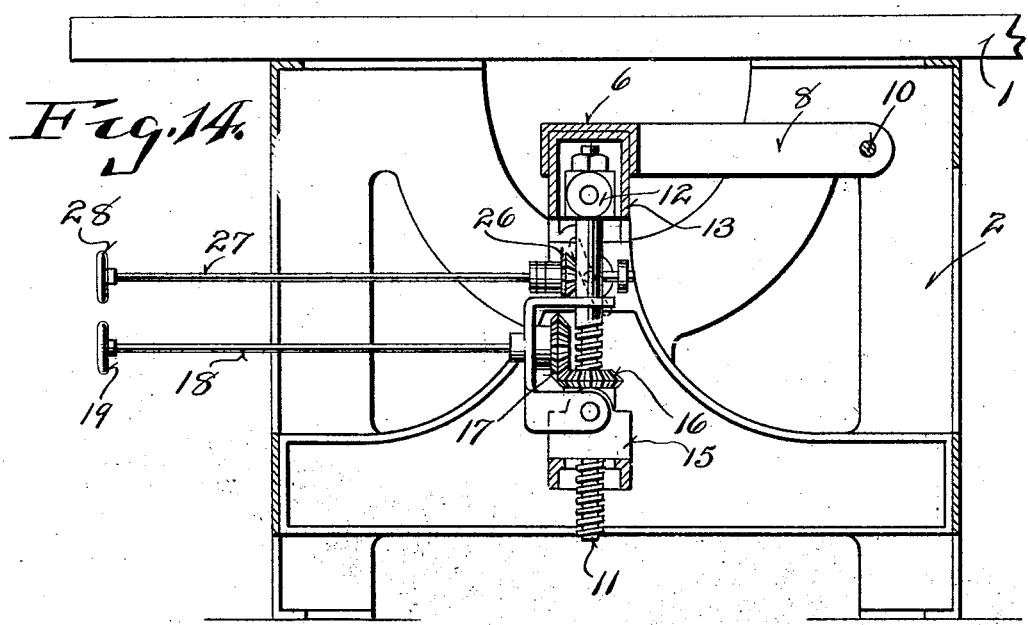
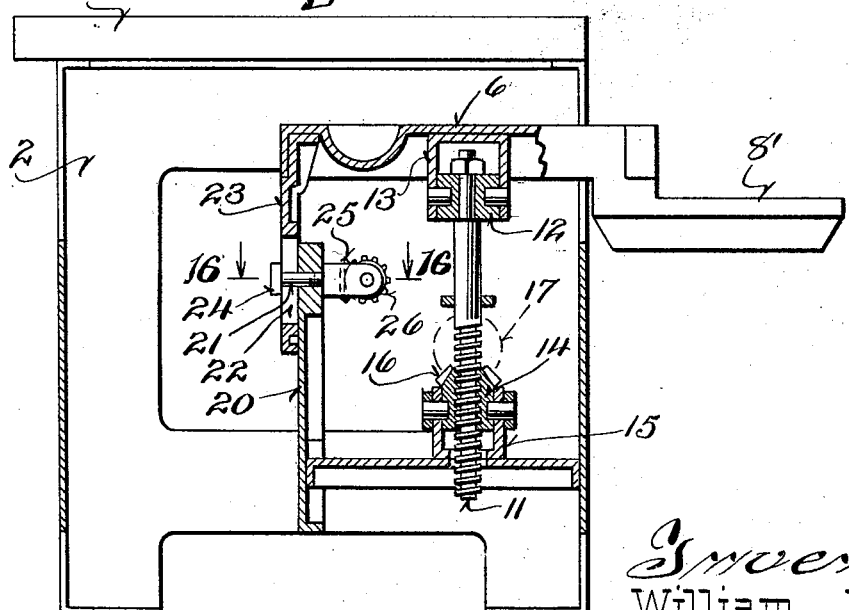
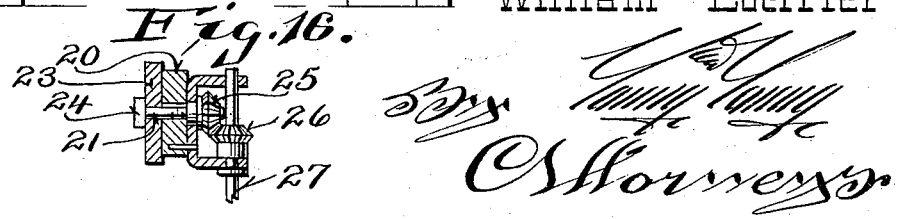

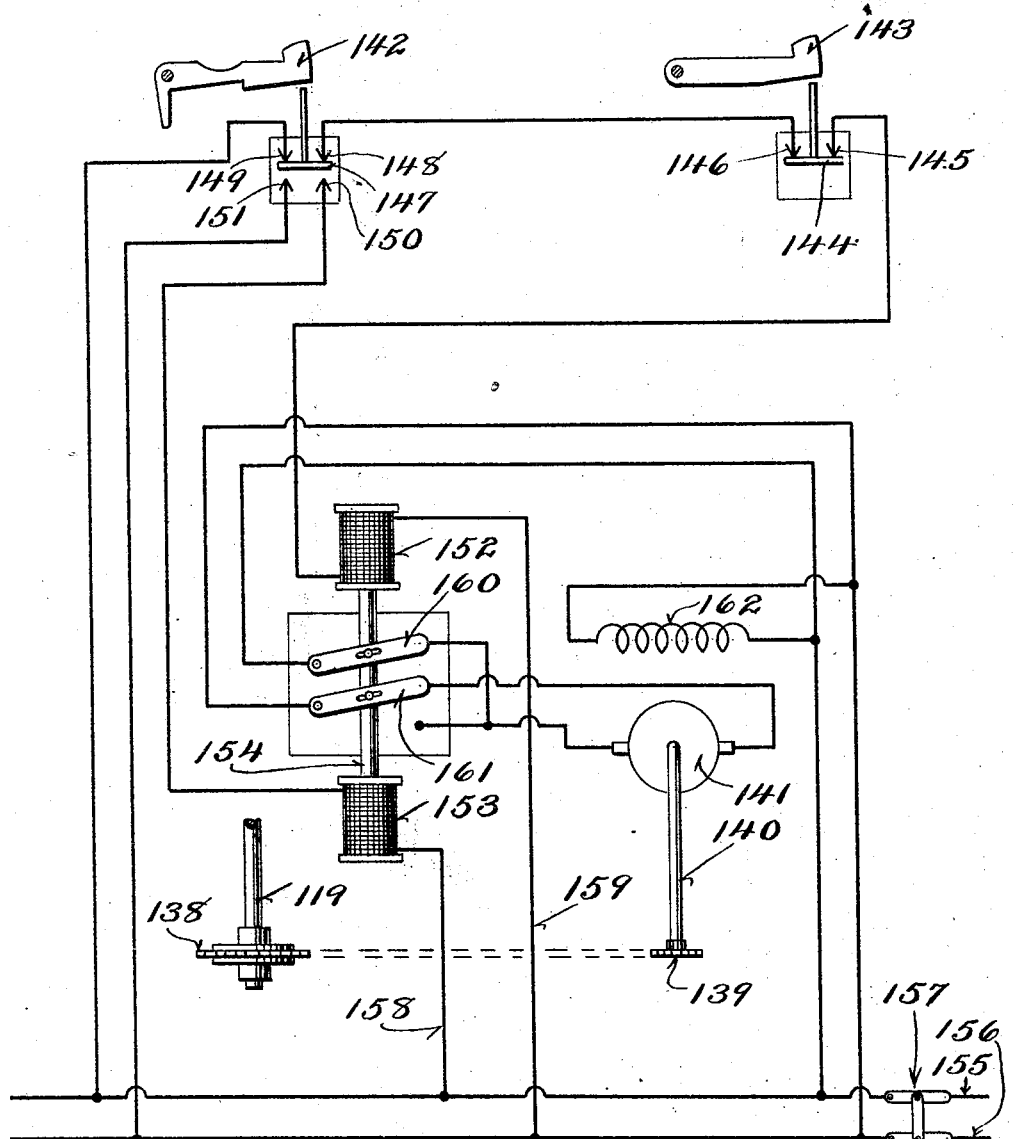

Patented Jan. 13, 1931

1,788,920

UNITED STATES PATENT OFFICE

WILLIAM LOEFFLER, OF SHEBOYGAN, WISCONSIN

SAWING MACHINE

Application filed April 19, 1926. Serial No. 102,984.

This invention relates to a saw.

Objects of this invention are to provide a power driven saw which is equipped with a gauge automatically set to the desired point and automatically retracted ready for another setting, and to so construct the machine that the work itself controls the positioning of the gauge, and the gauge is retracted only after the saw has completed its cut. In certain classes of work, it is not necessary for the gauge to make its complete retracting stroke after each cut. For example, the gauge may be so constructed and associated with the machine that it will take care of any one of a large number of different widths, and it may happen that the work never exceeds a certain width. Means are provided for caring for this condition, and a further object of this invention is to provide an adjustable stop for the gauge so as to limit its retraction and consequently, increase the speed of operation of the machine.

Further objects are to provide a saw of the above type in which the automatic operation of the gauge may be temporarily suspended and replaced by a manual control of the gauge, such manual control being accessible from the front of the machine.

It is well known that the speed of feed may be increased for certain types of work over that required for other types, and further objects of this invention are, therefore to provide means for readily altering the speed of the automatic feed so that it may be suited to the exact work in hand.

Further objects are to provide control fingers operated by the work and projecting through the table for automatically controlling the setting of the gauge, and also its retraction, and to provide means for simultaneously retracting all of the fingers when the manual control of the gauge is to replace the automatic control thereof.

Further objects are to provide means for elevating or lowering the saw and to provide additional means for locking the saw in its adjusted position so that its height may not be inadvertently changed.

Further objects are to provide a saw of the type set forth above, in which all of the controls are readily accessible from the front of the machine so that the utmost freedom is afforded the operator.

Further objects are to provide an automatic saw which will, as stated, set the gauge at the desired point, and which operates at a very high speed so that a maximum output may be secured from this machine quite in excess of any heretofore obtained.

Embodiments of this invention are shown in the accompanying drawings, in which:—

Figure 1 is a side elevation of the machine.

Figure 2 is a view of the manual control for the guide.

Figure 3 is a plan view of the machine.

Figure 4 is a side elevation showing a detail of the feeding mechanism.

Figure 5 is a view of the machine with the table top sectioned off and with part of the machine omitted.

Figure 6 is a sectional elevation on the line 6—6 of Figure 1.

Figure 7 is a sectional view on the line 7—7 of Figure 3.

Figure 8 is a sectional view on the line 8—8 of Figure 7.

Figure 9 is a fragmentary longitudinal sectional view through the upper portion of the machine showing one of the control fingers and the drive from the saw shaft.

Figure 10 is a sectional view on the line 10—10 of Figure 1.

Figure 11 is a sectional view on the line 11—11 of Figure 10.

Figure 12 is a sectional view transversely across the front portion of the machine showing the clutch controlling rod.

Figure 13 is a sectional view on the line 13—13 of Figure 12.

Figure 14 is a view partly in section showing the elevating mechanism for the saw.

Figure 15 is a sectional view taken at right angles to that shown in Figure 14.

Figure 16 is a sectional view on the line 16—16 of Figure 15.

Figure 17 is a view of a modified form of control.

The machine comprises a table 1 which is carried by a pair of side frame members 2. This table is slotted for the reception of the saw 3—see Figures 5 and 9. The saw is carried by a main shaft 4 which is driven by an electric motor 5—see Figures 1, 3, and 5. The motor and the shaft 4 are carried by a U-shaped frame 6 which is provided with a pair of rearwardly extending arms 7 and 8 which pivotally support the frame. This frame is provided with a downwardly stepped portion 8' which forms the support for the motor base. The rear portion of the arm 7 is apertured to receive a projecting bearing 9 formed upon one of the side frames 2 as shown in Figure 5, and the rear portion of the arm 8 is apertured to loosely receive the shaft 10 hereinafter described in greater detail.

The means for elevating the saw or adjusting its height comprises a screw 11 as shown in greatest detail in Figures 14 and 15. This screw has its upper end reduced and clamped to a block 12. The block 12 is pivotally carried by a member 13 secured to the underside of the frame 6. This screw is received by a nut 14 which is revolubly supported by means of a member 15 carried by a stationary portion of the frame as shown in Figure 15. The nut 14 is provided with a bevel gear 16 which meshes with a bevel gear 17—see Figure 14—carried by the inner end of the adjusting shaft 18, such shaft being provided with a hand wheel 19 at the front side of the machine.

Means are provided for locking the frame 6 in adjusted position, and such means comprise a stationary upright 20 as shown in Figure 15 which is secured to a stationary portion of the machine. This upright carries a bolt 21 which is splined thereto as indicated in Figure 16. The bolt passes through a slot 22 formed in a downwardly hanging front apron 23 carried by the frame 6 as shown in Figure 15. The bolt is provided with a head 24 at its outer end and the threaded portion of the bolt is received by the internally threaded bevel gear 25—see Figure 16. This bevel gear meshes with a bevel gear 26 carried by the locking shaft 27, such locking shaft extending outwardly adjacent the shaft 18 and being provided with a hand wheel 28.

The saw shaft 4 is provided with a worm 29 as shown in Figures 5 and 9 which meshes with a worm wheel 30 carried by a rearwardly extending shaft 31. This shaft 31 is provided with a bevel pinion 32 which meshes with a bevel gear 33. This bevel gear 33 is rigidly attached to a sleeve 34' which is revolubly carried by the shaft 10. Further, the sleeve has its forward and rear ends journaled in a housing 34' as shown in Figure 5. This sleeve also rigidly carries a large gear 35, a small gear 36 and an intermediate gear 37. These gears are shown in Figures 5 and 6 and are adapted to mesh with gears 38, 39 and 40, which latter group of gears is rigidly joined together and slidably splined upon a shaft 41 as shown most clearly in Figure 6. This last mentioned group of gears is adapted to be shifted so that different gear ratios may be established between the saw shaft and the shaft 41. They are shifted by means of a forked lever 42 which is rigidly carried by a transverse gear shift rod 43. This gear shift rod is controlled by means of a pin and slot connection with a lever 44 carried by the rear end of a longitudinally extending shaft 45 as shown in Figures 1 and 5. The shaft 45 is provided at its front end with a lever 46 equipped with a manipulating handle 47. This gear shift handle 47 is provided with a locking pin 48—see Figure 1—which is adapted to enter any one of a plurality of apertures 49 as shown in Figure 12, formed in the front portion of the machine framework. Thus, when the lever 46 is shifted, different gear ratios are established between the shaft 41—see Figure 6—and the saw shaft.

The shaft 41 transmits feeding motion to the feeding mechanism. It is provided at its outer end with a sprocket wheel 50 which is connected by means of a chain to an upper sprocket wheel 51 loosely mounted upon an upper shaft 52. This sprocket wheel is adapted to be connected to the shaft under normal conditions by means of a clutch as indicated at 53—see Figure 6. The shaft 52 carries a sprocket wheel 54 and is itself carried by a bracket 55 secured to the upper portion of the machine. The bracket 55 rigidly carries an upright 56 for a purpose hereinafter to appear.

Referring to Figures 3 and 6, it will be seen that the frame for carrying the feeding mechanism is pivotally mounted upon the shaft 52 by means of a rocking frame or pivoted frame 57. This frame 57 carries at its outer end a transverse shaft 58. The frame 57 is provided with a forwardly extending internally threaded boss 59—see Figure 1—through which an adjusting screw 60 passes. The lower end of the adjusting screw is provided with a ball 61 which bears against a horizontal bracket 62 carried by the stationary uprights 63. These stationary uprights guide the forwardly extending portion of the frame 57 as shown in Figure 3.

The frame 57, as stated, carries the transverse shaft 58, and a second frame 64 is pivotally mounted upon such shaft. This frame 64, as may be seen from Figures 1 and 3, carries a forward and rear shaft 65 and 66 respectively. The shafts 65 and 66 are provided with sprocket wheels 67 and 68 at their outer ends which are joined by means of a suitable sprocket chain. The shaft 65 further carries a sprocket 69—see Figure 3—intermediate its end which is joined by means of a chain to a sprocket wheel 70 loosely mounted upon the shaft 58. The sprocket wheel 70 is rigidly connected with a sprocket wheel 71, such latter sprocket wheel being connected by means of a chain to the sprocket wheel 54, previously described, attention being directed to Figures 3 and 6.

At the outer end of the shaft 65, a feeding drum or narrow wheel 72 is secured, and is positioned in direct alignment with the saw. This feeding wheel is preferably serrated as shown. The damage to the material fed thereby is obliterated by the saw cut. The outer end of the shaft 66 carries a rear feeding roller or drum 73 which may be either smooth or serrated. Immediately below the feeding members 72 and 73 are positioned elongated rollers 74 and 75 journaled beneath the table as indicated in Figures 3 and 9 and projecting slightly above the top of the table. These rollers, therefore, sustain the pressure imposed upon the work by the feeding rollers 72 and 73.

It will be seen from the mechanism thus far described that rotary motion is imparted to the feeding rollers 72 and 73 from the saw shaft 4 by means of the chain and sprocket connections described in detail, and by means of the variable gear mechanism. Thus, the desired rate of speed may be readily secured by manipulating the gear shift handle 47.

In order to insure the holding of the work immediately adjacent the saw, a wooden shoe 76—see Figure 4—is provided. This wooden shoe is supported at its upper end by means of the bracket 77. The bracket in turn is supported by a pin 78 projecting outwardly from the adjustable slide 79. This adjustable slide is carried by means of a frame or guide 80 secured to the frame 64 as shown in Figure 3. As shown in Figure 4, the guide 79 is adjusted by means of the screw 81 loosely passing through the guide 80 and threaded into the slide 79. Thus, the exact relative position of the shoe and the feeding rollers 72 and 73, is secured in a very simple and easy manner.

The shoe 76, as stated, is preferably formed of wood and is cut out to accommodate the saw. It is provided with a forward and rear downwardly extending portion which engages the work, as illustrated in Figure 4, immediately in front of and to the rear of the saw. In order to prevent excessive rocking of the frame 64 such frame is provided with an upwardly extending arm 82 as illustrated in Figure 1. This upwardly extending arm is joined to the upright 56 by means of a link 83. Preferably, a slight amount of play is allowed by means of a slot in one end of the lever 83 or in the associated parts. For example, as shown in Figure 1, the forward end of the link 83 is provided with a small slot to accommodate the connecting bolt joining the arm 82 and such lever. Thus, the frame 64 is prevented from excessive rocking, although permitting a limited amount of rocking.

The mechanism for automatically gauging or guiding the work will now be described. This mechanism comprises a gauge or guide 84 which is carried by means of a pair of bars 85 as shown most clearly in Figures 3, 7, and 8. The bars 85 are dovetailed in slots formed in the table 1 as shown in Figure 8 and are each provided on their under side with racks 86. These racks mesh with pinions 87 carried by a longitudinally extending shaft 88. The shaft 88 and the pinions are most clearly shown in Figure 5 from which it will be seen that the shaft is supported adjacent each pinion and extends forwardly through the front of the machine, such shaft being provided with a squared front end as indicated at 88'. Thus, it will be seen that rotation of the shaft 88 advances or retracts the gauge 84. Two distinct means are provided either one of which may be used for advancing the gauge. One of the means is a manually controlled device, and the other an automatic device. The manually controlled device will first be described.

The manual control device comprises a casing 89 which is removably secured to the front of the frame work of the machine as shown in Figure 1, and is adapted to be completely removed when the automatic device is employed. This manual control comprises a pinion 90 which is journaled in the casing 89 and which has a squared aperture for the reception of the squared end 88' of the shaft 88 as shown most clearly in Figure 5. This pinion meshes with a gear 91 carried by a shaft 92 projecting outwardly through the front of the casing 89 and is provided with a crank 93, such crank being in turn provided with a handle 94 as shown most clearly in Figures 1 and 2. This crank works in front of a disc 95 which is provided with graduations indicating the amount of advance of the guide 84 so that the handle may be set at any desired point. The disc is further provided with a plurality of apertures 96 into any one of which a slidable plunger 97 carried by the handle 94 may be projected, to thus temporarily lock the handle in adjusted position.

Thus, when the operator desires to manually manipulate the crank to the desired position, and thereafter, insert the plunger 97 in the appropriate aperture 96 this correspondingly advances the gauge and spaces it from the saw a distance corresponding to the reading on the dial 95. Obviously, any number of apertures may be provided so that the exact distance may be secured.

The mechanism for securing the automatic control of the gauge will now be described. This mechanism comprises a pinion 98 rigid with the shaft 88 as shown in Figure 5, and meshing with a spur gear 99 integral with a bevel gear 100. This bevel gear meshes with a bevel gear 101 rigidly carried by a transverse shaft 102. This transverse shaft 102 is driven by means of a gear 103 rigidly carried by the shaft by mechanism hereinafter described (see Figure 10). The shaft 102 constitutes a drum shaft and the drum is indicated by the reference character 104. This drum is shown more clearly in Figure 10, and it will be seen from this figure, and also from Figure 5, that it is provided with a plurality of shoulders 105 formed in a regular sequence and spaced peripherally around the drum. The rigid connection between the bevel gear 101 and the shaft 102 is secured by means of a collar 106 slidably splined upon the shaft 102, such collar and the hub of the gear 101 being provided with integral locking jams. Normally the collar is held locked to the gear 101 by means of a set screw 107. However, when it is desired to use the manual control previously described, the set screw is loosened and the collar is slid out of engagement with the hub of the gear 101, thus allowing the gear to freely turn upon the shaft 102. However, under normal conditions, as when the automatic mechanism is used, the collar rigidly locks the gear 101 to the shaft.

The drum cooperates with a plurality of fingers 108 which are pivoted beneath the table and are provided with portions projecting above the table as shown in Figure 11. The outermost finger indicated by the reference character 108′ is adapted to engage the outermost shoulder formed on the drum when the drum is rotated and thus to arrest the motion of the gauge 84 when the gauge has moved outwardly its greatest distance. The successive fingers engage successive shoulders when they are depressed, and thus arrest the motion of the drum at different points. Consequently, the gauge 84 is advanced different distances depending upon what fingers or group of fingers is depressed. The depression of the outermost finger 108′ allows the least distance between the gauge 84 and the saw as it permits the drum 104 to rotate its maximum amount, and consequently, to advance the gauge the greatest distance. The depression of all of the fingers with the consequent depression of the right hand finger, shown in Figure 10, allows the minimum inward motion of the gauge, and consequently, gives the greatest space between the gauge and the saw.

These fingers 108 and 108′ are of substantially the same construction except that the finger 108′ is provided with a link or rod 109 pivoted thereto as shown in Figure 13. Each of the fingers is spring pressed into its uppermost position as indicated in Figures 10, 11 and 13. They are each provided with a stop or shoulder 110 against which the appropriate shoulder on the drum is adapted to strike. The outermost finger 108′ not only serves as a gauging finger, but also initiates the actuation of the drum, and consequently, of the gauge as will be described. The depression of this finger causes the depression of the link 109 which, as may be seen from Figures 12 and 13, is guided by a stationary portion of the machine, and actuates the shift rod 111. It is to be noted that the section shown in Figure 12 is so taken as to omit all of the fingers 108 and the drum, and to show only the finger 108′ and the associated mechanism for the sake of clearness in disclosure. Referring to Figure 12, it will be seen that the lower end of the link or plunger 109 carries a cam 112 which cooperates with a guide 113 carried by the shift rod 111, and thus throws the rod to the left. This rod is guided by means of the guides 114 and carries at its outer end a forked arm 115 which, as may be seen from Figure 10, shifts the central portion of the clutch 116 into contact with either the face of the sprocket wheel 117 or that of the reversely rotating sprocket wheel 118, such sprocket wheels being driven as hereinafter described. Thus, the depression of the finger 108′ causes the sprocket wheel 117 to be operatively coupled with the jack shaft 119 as shown in Figure 10, such jack shaft being provided with a pinion 120 meshing with the gear 103 of the drum shaft. Thus the drum shaft, and consequently, the drum is rotated until the appropriate shoulder of the drum strikes against the corresponding stop 110 of one of the fingers. It is to be understood that the clutch 116 is of the friction type so that when the motion of the drum is arrested, the clutch merely slips without doing any damage.

The shift rod 111 is urged to the right by means of the spring 121 (see Figure 12) so that the clutch 116 normally frictionally engages the sprocket wheel 118 and maintains the drum in desired initial position, the reverse motion of the drum being arrested by means of a stop for the sliding bars 85 of the gauge 84 as shown in Figure 7. This stop consists of a block 121′ which carries a rubber bumper 122, and which is itself carried by means of a threaded bolt 123 which screws into a travelling nut 124 mounted beneath the table. The nut 124 can be adjusted to any desired position by means of the elongated screw 125, such screw being provided with a knurled thumb nut or wheel 126. When the desired adjustment has been secured, the bolt 123 is tightened by means of its knurled head 127 and the block 123 and the nut 124 clamp the adjacent portion of the table between them and thus lock the stop in desired adjusted position.

From the mechanism thus far described, it is apparent that when the operator places a board on the table 1, he depresses the first or outermost finger 108'—see Figures 1 and 10—and depresses such other fingers as correspond to the width of this cut; that is to say, such other fingers as are covered by the board. The gauge 84 is consequently advanced the appropriate distance so that it contacts with the board, and the board is thereafter passed under the feeding rollers 72 and 73, and is automatically fed through the machine.

In order to prevent immediate reversal of the drum 104—see Figure 10—and consequently, retraction of the guide 84 when the board passes from over the finger 108', additional means are provided. This additional means comprises an auxiliary finger 128 which is pivoted beneath the table and projects through a slot in the table adjacent the saw as shown in Figure 9. This finger is provided with a downwardly extending arm 129 and is pivoted to a plunger or link 130. This plunger or link projects into proximity to the shifter bar 111 as shown in Figures 9 and 12, and is adapted to project across the upper face of the bar as shown in such figures. When it is projected across the upper face of the bar it forms a stop against which the upwardly projecting finger 131 carried by the bar 111 is adapted to contact as shown most clearly in Figure 12. This mechanism, therefore, locks the shift bar 111 in the position shown in Figure 12, and consequently prevents the reversal of the drum 104 with consequent retraction of the gauge 84. However, when the work has passed from over the finger 128 after the saw cut has been completed, such finger will spring upwardly and retract the stop or link 130 and allow the spring 121 to retract the shift bar, and consequently, permit the reversal of the drum as the reversely rotated sprocket wheel 118 is frictionally connected to the jack shaft 119.

The sprocket wheels 117 and 118 are driven from an auxiliary electric motor 132 as indicated in Figures 1 and 6. This electric motor is provided with a sprocket wheel 133 and with a gear 134. The gear 134 meshes with a gear 135 as shown in Figure 6, carried by a jack shaft 136. This jack shaft carries a second sprocket wheel 137. The sprocket wheels 133 and 137 are connected by means of suitable chains with the wheels 117 and 118 to cause reverse rotation of such last mentioned sprocket wheels as previously described.

Other means may be provided than the mechanical means described above for effecting the automatic spacing or positioning of the gauge 84. For example, an electrical control may be provided by merely removing the clutch and sprocket wheels 116, 117, and 118 from the shaft 119. Instead of these sprocket wheels, a single sprocket wheel 138 is held between friction discs to the shaft 119 and is directly connected by means of a chain to the sprocket wheel 139 carried by the armature shaft 140 of the motor, the armature being indicated by the reference character 141 in Figure 17. The finger corresponding to the finger 108' is indicated in Figure 17 by the reference character 142, and the finger corresponding to that indicated by the reference character 128 and previously described as indicated by the reference character 143. The finger 143 controls a switch whose movable contact 144 normally bridges the stationary contacts 145 and 146. The switch controlled by the finger 142 is provided with a movable contact 147 which normally bridges the stationary contacts 148 and 149 when the bar is elevated. However, the second switch is provided with a second pair of stationary contacts 150 and 151. A pair of solenoids or magnets 152 and 153 control a reversing bar 154. Current is supplied the motor and the solenoids by the mains 155 and 156 and the entire electrical system is controlled by the main switch 157. The circuit for the solenoid 153 includes a conductor 158 extending from the main 155. The other side of the solenoid is connected to the contact 150. The other contact 151 is connected to the main 156. The circuit for the other solenoid includes a conductor 159 which extends from the main 156. The other side of the solenoid 152 is connected to the contact 145. The other contact 146 is connected to the contact 148. The contact 149 is connected to the main 155. Thus, when the switches are in the position shown, the solenoid 152 is energized and the reversing switch is in the position shown, This switch may be of any type. For example, it may comprise a pair of movable blades 160 and 161 which are connected to the mains as shown, and which control the direction of flow of current through the armature. The field 162 of the motor is supplied directly from the mains.

The position of the parts shown in Figure 17 corresponds to a retracted position of the gauge 84 when the work is placed upon the table. It depresses the first finger 142 and such other of the fingers over which the work overlaps. This finger depresses the movable contact 147 and closes the circuit through the solenoid 153, thus reversing the direction of rotation of the motor, and consequently, advancing the gauge. This advancing motion continues until the appropriate finger arrests further rotation of the drum 104 as previously described. When the work has passed from the finger 142, it springs up and the movable contact bridges the stationary contacts 148 and 149. However, nothing happens as the movable contact 144 of the other switch is still depressed. When, however, the work passes from the finger 143, the movable contact 144 closes the circuit of the solenoid 152 and consequently, reverses the motor.

It will be seen that in both forms of the invention, the gauge fingers control the position of the gauge and cause it to advance to the requisite point. Also, it is to be noted that the finger adjacent the saw (either the finger 128, Figure 9, or 143, Figure 17) controls the retraction of the gauge in conjunction with the finger 108′ Figures 10 and 12, or 142, Figure 17.

Thus the gauge is not retracted until the cut has been completed.

The feeding of the work past the saw continues although the gauge may be retracted, as the feeding mechanism is driven from the saw shaft as described above.

Thus, it will be seen that automatic mechanism has been provided in conjunction with a saw whereby the accurate and rapid setting of the gauge is automatically accomplished without any effort on the part of the operator.

It will be seen further that mechanism has been provided for retracting the gauge after it has served its purpose.

It sometimes happens that a considerable amount of work has to be done upon material considerably narrower than the maximum capacity of the machine. It is, therefore, unnecessary for the gauge to be completely retracted to its farthest point after each operation.

The mechanism shown in Figure 7 permits the stop limiting the retraction of the gauge to be set at any desired point to accommodate such a situation.

It is to be noted therefore that an automatic machine has been provided which will saw the material into the desired widths, which will set the gauge automatically, which will retract the gauge and which will automatically feed the work through the machine.

It is to be further noted that although the machine accomplishes a large number of automatic operations, that nevertheless, it is relatively simple in construction and is reliable in operation.

When the manual control of the gauge is to be used, it is desirable to retract all of the fingers 108 and 108′. This is readily accomplished by providing a cam bar 162 extending transversely across the body portion of the fingers and located beneath the table as shown in Figures 5 and 11. This bar may be provided with a manipulating handle 163 as shown most nearly in Figure 5.

Although the invention has been described in considerable detail, such description is intended as illustrative rather than limiting as the invention may be variously embodied and as the scope of such invention is to be determined as claimed.

I claim:

1. The combination of a power driven saw, a gauge for the work, automatic mechanism for advancing the gauge, a group of fingers controlled by the work, and a drum geared to the gauge and having a plurality of shoulders, said fingers having stops for selectively engaging the shoulders to arrest the movement of the gauge.

2. The combination of a power driven saw, a gauge for the work, mechanism for advancing and retracting said gauge, a drum operatively connected to said gauge and having a plurality of shoulders thereon, a group of fingers operated by said work for selectively engaging said shoulders, and a spaced finger for controlling the retraction of the gauge after the cut has been completed.

3. The combination of a table having a slot therethrough, a saw projecting through said slot, a gauge adapted to travel transversely across said table and having a pair of racks rigidly attached thereto, a longitudinally extending shaft having a squared projecting end and having a pair of pinions meshing with said racks, a casing adapted for detachable attachment to said table, a gear journaled in said casing and having a squared aperture for the reception of the squared end of said shaft, a second gear carried within said casing and meshing with said first mentioned gear, a crank rigidly connected to said second gear, a dial carried by said casing, interlocking means carried by said crank and dial, automatic means controlled by the work for setting the gauge, and means for rendering said automatic means inoperative.

4. The combination of a power driven saw for operating upon work having a flat face and having an edge, a gauge for engaging the edge of the work, means for engaging the face of the work, and other means controlled by said first mentioned means for automatically controlling the positioning of the gauge.

5. The combination of a power driven saw for operating upon work having a flat face and having an edge, a gauge for engaging the edge of the work, automatic mechanism for positioning the gauge, and a plurality of fingers for contacting with the flat face of the work for automatically controlling the positioning of the gauge.

6. The combination of a table having a slot therein, a saw projecting through said slot, a gauge for the work slidable across the table and having a pair of racks, a pair of pinions for engaging said racks, manual means for operating said pinion, automatic means for advancing said rack, and means for throwing said automatic means out of operation when it is desired to use said manual means.

7. The combination of a table having a slot therein, a saw projecting through said slot, a gauge for the work slidable across the table and having a pair of racks, a pair of pinions for engaging said racks, manual means for operating said pinion, an indicating dial adjacent said manual means, means for locking said manual means with reference to said dial, automatic means for advancing said rack, and means for throwing said automatic means out of operation when it is desired to use said manual means.

8. The combination with power means for advancing a saw table gage, of a drum connected to be rotated as the gage advances and having a plurality of spaced shoulders, a plurality of stop-members independently and selectively movable into position to oppose the rotation of the drum with the advance of the gage, and thereby set the gage at a desired point.

9. The combination with power means for advancing a saw-table gage, of a drum having a plurality of spaced stop-shoulders and connected to be rotated as the gage advances, a plurality of stop members selectively movable into position to oppose the rotation of the drum with the advance of the gage and thereby set the gage at a desired point and means for controlling the retraction of said gage.

In testimony that I claim the foregoing I have hereunto set my hand at Sheboygan, in the county of Sheboygan and State of Wisconsin.

WILLIAM LOEFFLER.